United States Patent [19]

Ikemori

[11] 4,427,268
[45] Jan. 24, 1984

[54] VARIABLE MAGNIFICATION RATIO LENS

[75] Inventor: Keiji Ikemori, Yokohama, Japan

[73] Assignee: Canon Kabushiki Kaisha, Tokyo, Japan

[21] Appl. No.: 166,798

[22] Filed: Jul. 8, 1980

[30] Foreign Application Priority Data

Jul. 10, 1979 [JP] Japan .................................. 54-87117

[51] Int. Cl.³ ............................................. G02B 15/02
[52] U.S. Cl. ...................................... 350/422; 350/453
[58] Field of Search ................................. 350/422, 453

[56] References Cited

U.S. PATENT DOCUMENTS

| 2,854,891 | 10/1958 | Schade | 350/453 |
| 2,906,172 | 9/1959 | Klemt | 350/422 |
| 3,645,602 | 2/1972 | Clave et al. | 350/422 X |
| 3,871,741 | 3/1975 | Clave et al. | 350/422 X |
| 4,174,153 | 11/1979 | Laurant | 350/422 |
| 4,318,585 | 3/1982 | Matsumura | 350/453 X |
| 4,318,592 | 3/1982 | Tanaka | 350/422 X |

Primary Examiner—John K. Corbin
Assistant Examiner—Scott J. Sugarman
Attorney, Agent, or Firm—Toren, McGeady and Stanger

[57] ABSTRACT

Disclosed is a view finder for a reflex camera, so designed that the view finder is provided with an objective lens group L1, the fixed lens group L2 and the eye piece lens L3 in sequence, whereby the distance between the front lens group and the fixed lens group is constant and there is provided a first dismountable attachment lens in front of the objective lens group and a second dismountable attachment lens at the back of the objective lens group. The sign of the refractive power of the first and the second attachment lens is inverse to that of the objective lens group. The first attachment lens and the objective lens group and the objective lens group and the second attachment lens respectively form a substantial afocal lens system.

6 Claims, 33 Drawing Figures

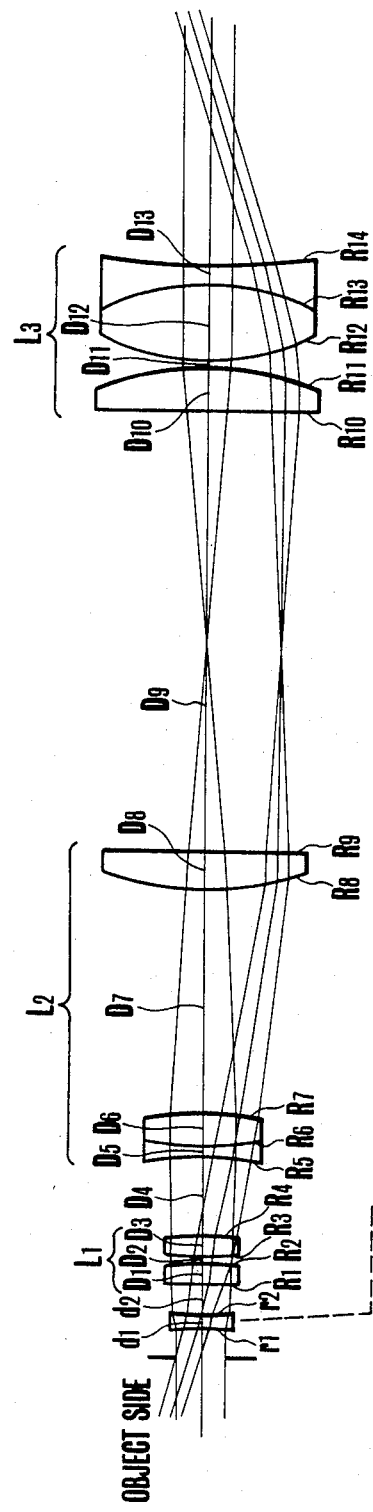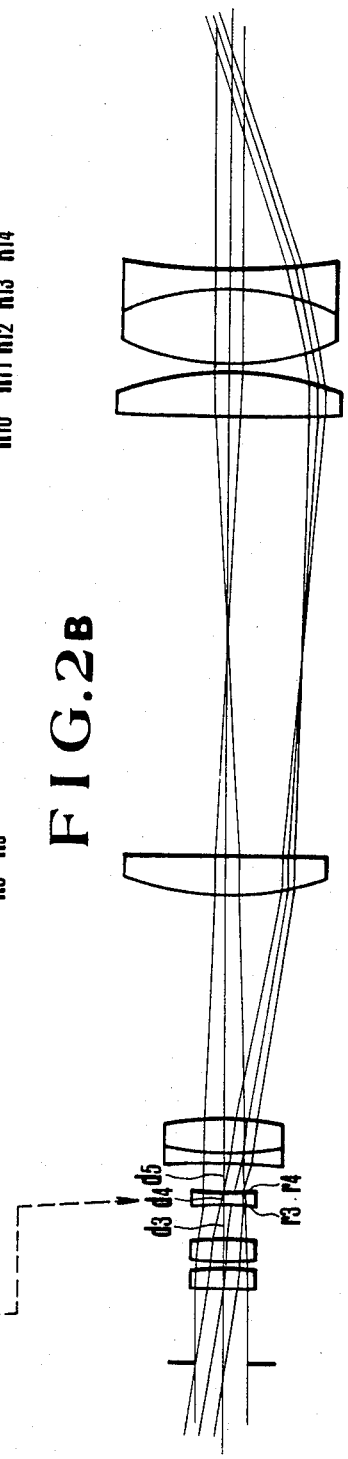

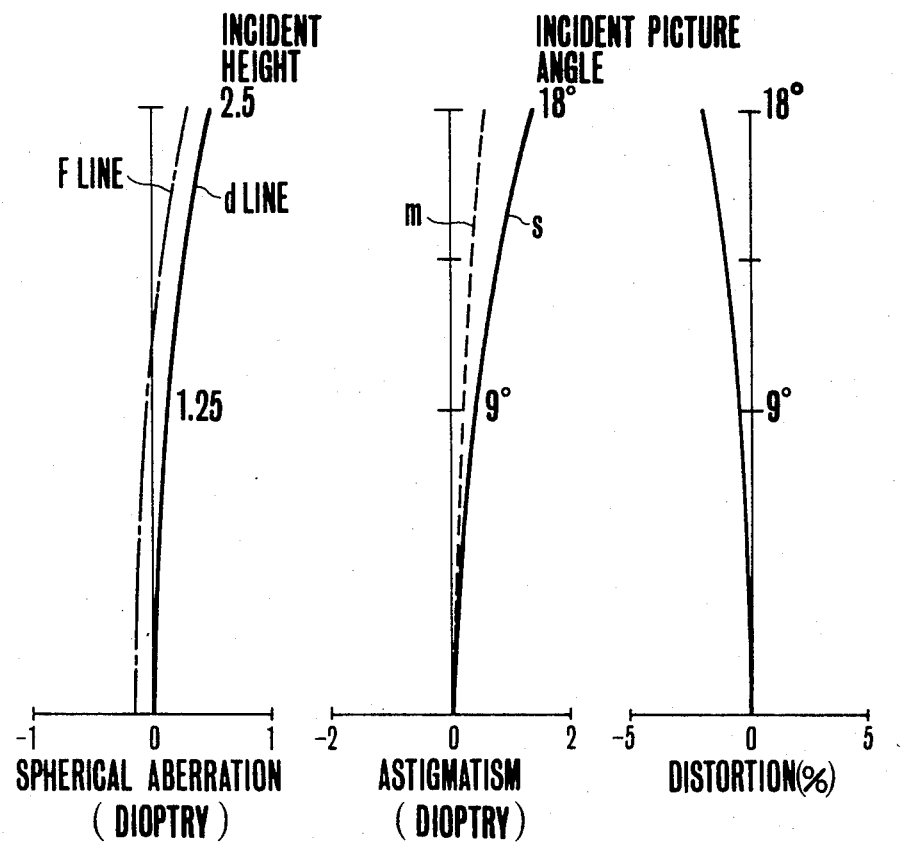

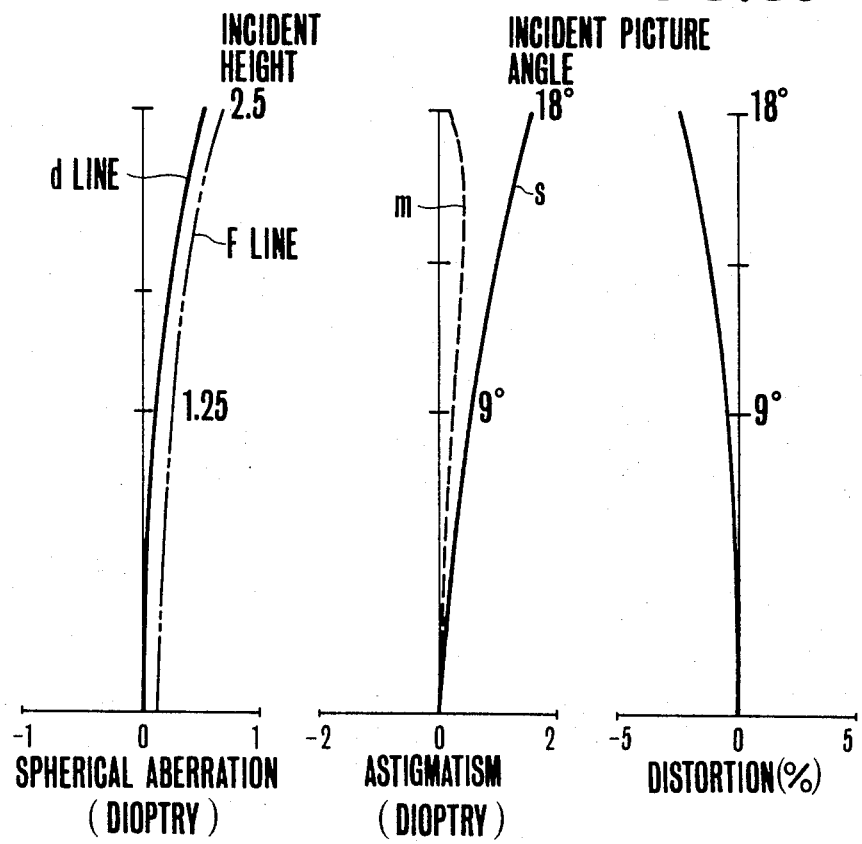

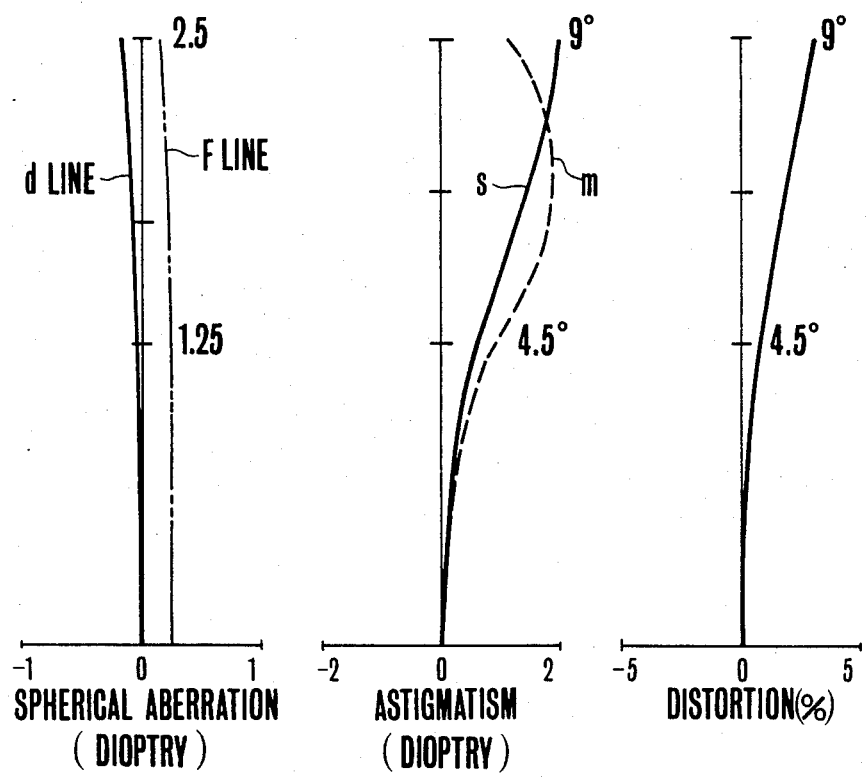

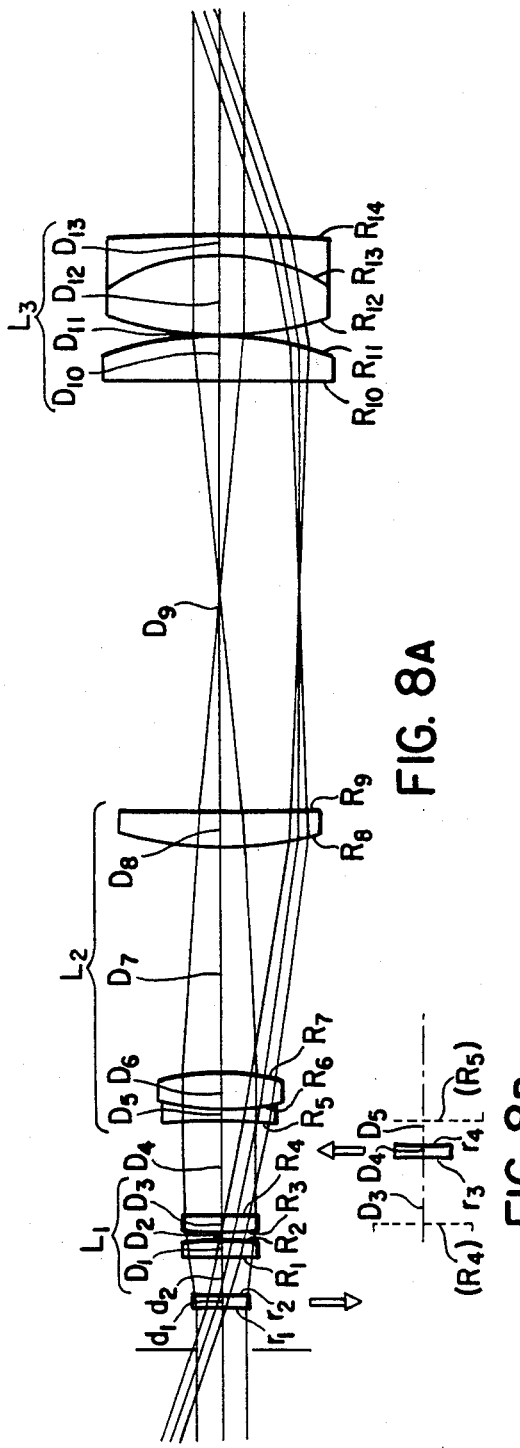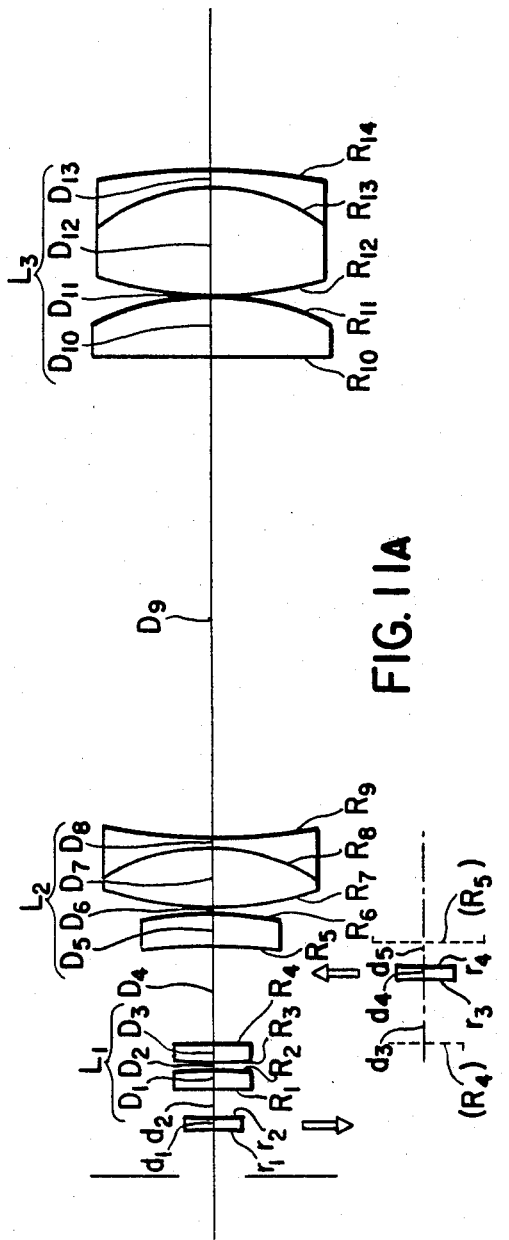

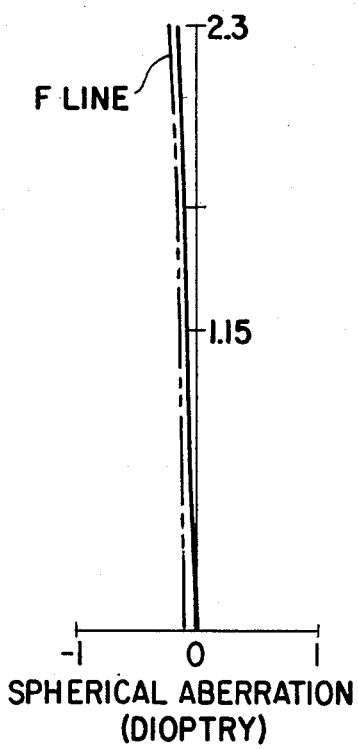
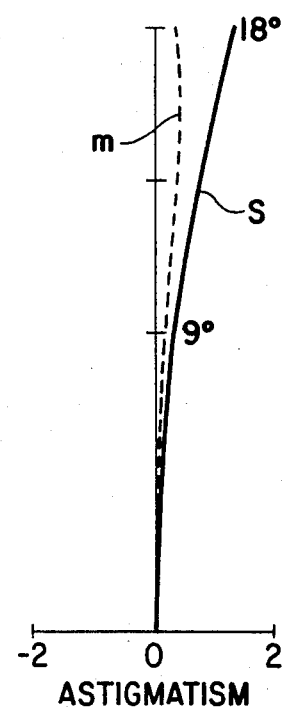
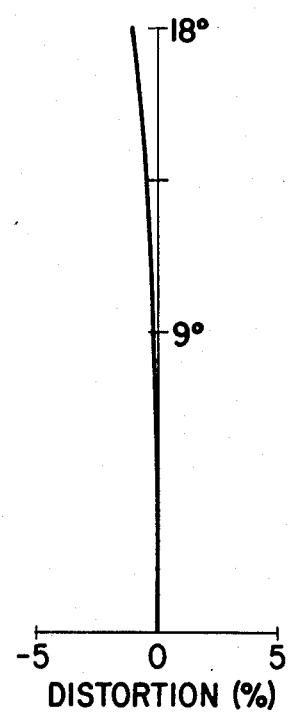
FIG. 9A  FIG. 9B  FIG. 9C
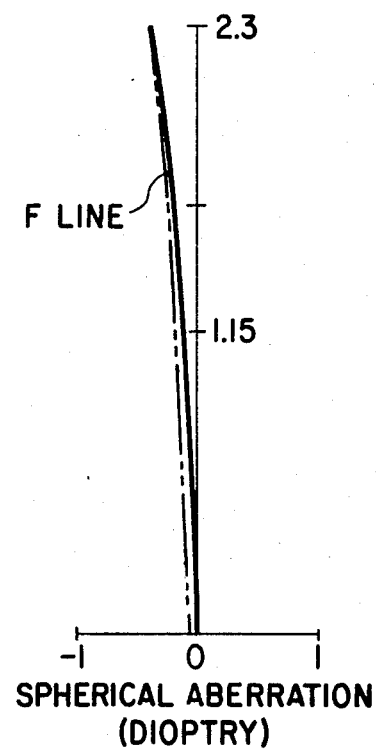
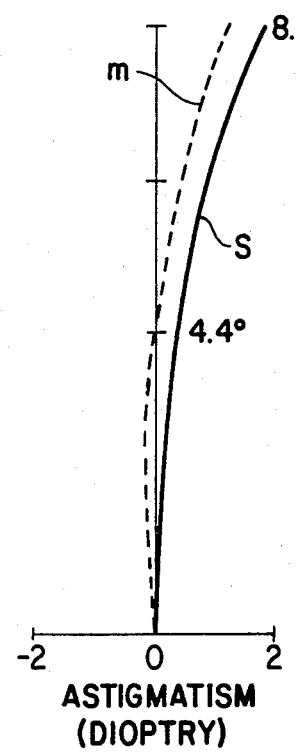
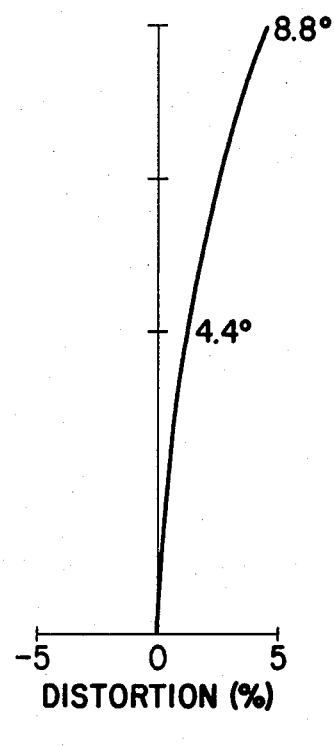
FIG. 10A  FIG. 10B  FIG. 10C

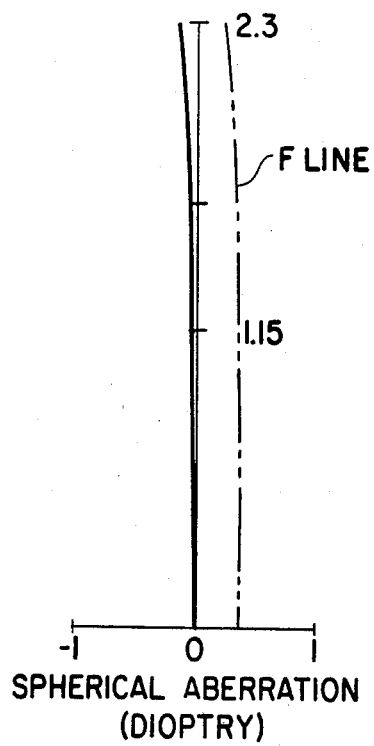
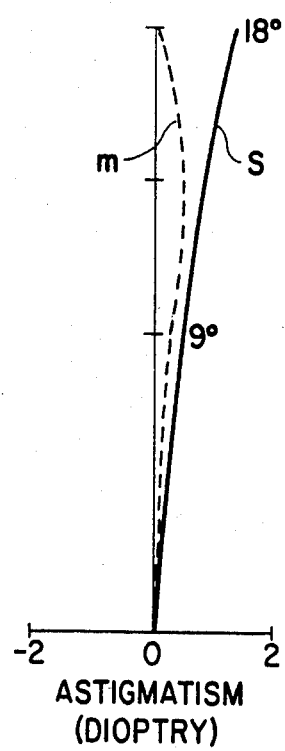
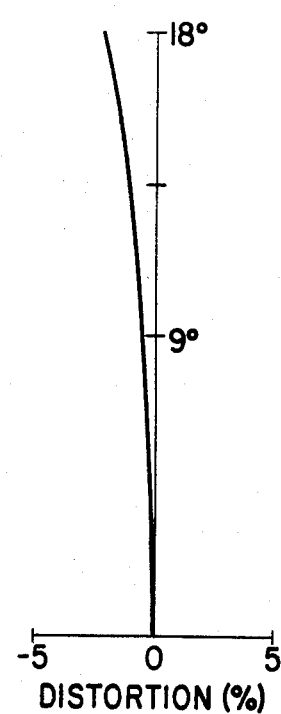
FIG. 12A  FIG. 12B  FIG. 12C
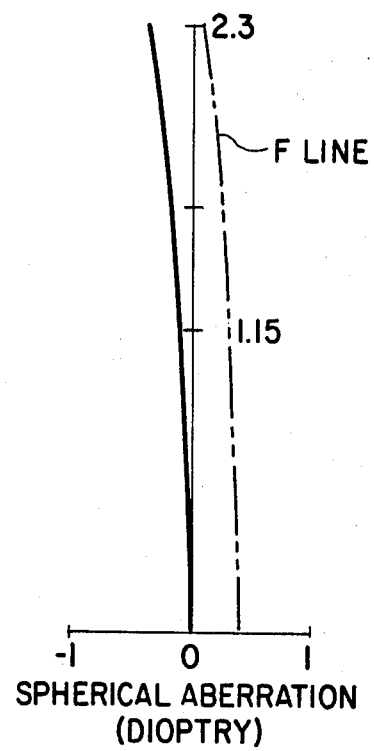
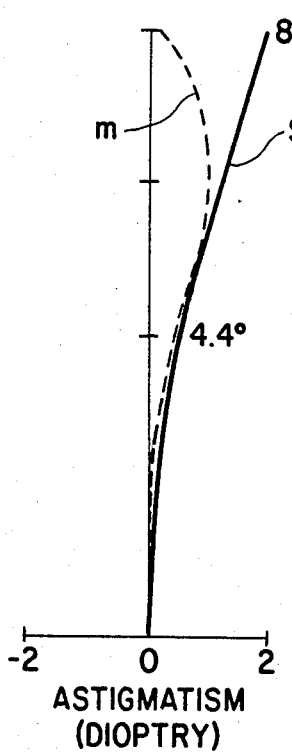
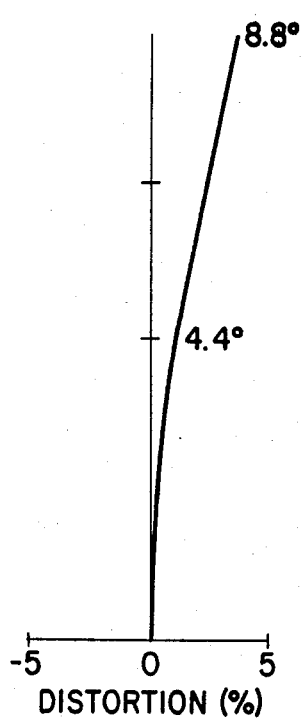
FIG. 13A  FIG. 13B  FIG. 13C

VARIABLE MAGNIFICATION RATIO LENS

BACKGROUND OF THE INVENTION

The present invention relates to an optical system whose magnification ratio is variable, particularly an optical system in accordance with which the attachment lens is mountable in and dismountable from the optical path.

When a scene is observed in the case of a single lens reflex camera, the photographer looks through the eye piece lens arranged in the prism housing of the camera body. Accordingly, when the scene is observed along the direction at a right angle to the optical axis of the photographing lens, with the eye kept apart from the camera body, an angle form finder is used. The angle finder is provided with a mirror or a reflecting plane of the prism in the optical path of the finder so as to bend the optical path. Recently, the magnification ratio has been made variable.

In the Japanese Utility Model Application Nos. Sho 51-152337(1976) and Sho 52-133632(1977) an angle finder is disclosed whose magnification ratio is variable by mounting a Galilean optic consisting of a positive lens and a negative lens in front of the objective lens in the finder optical system or dismounting the Galilean optics from the objective lens. In the case of Sho No. 51-152337, the Galilean optic is rotated around the axis vertical to the optical axis in such a manner that the light travels between the positive and the negative lens so as to lower the magnification ratio. In the case of Sho No. 51-133632, a Galilean optic is secured on a turret which rotates around an axis parallel to the optical axis so as to mount or dismount the Galilean optic by rotating the turret.

On the other hand, the variable magnification lens system in accordance with the present invention can be applied to the telescope or the binoculars.

SUMMARY OF THE INVENTION

An object of the present invention is to reduce the space in which the attachment optic is inserted or loaded.

Another object of the present invention is to improve the picture quality not only at the time of high magnification ratio but also at low magnification ratio.

For these objects, a first lens group, a second positive lens group and a third positive lens group are arranged in sequence, whereby the distance between the principal point of the first lens group and that of the second lens is kept constant in such a manner that the magnification ratio when the attachment optic is inserted in front of the first lens group (at the side of the object) differs from that when the attachment optic is inserted at the back of the first lens group (at the side of the image). At this time, the power of the first lens group has a different sign from that of the power of the respective attachment optic, while the first attachment lens and the objective lens group and the object lens group and the second attachment lens respectively form a substantial afocal system. Accordingly, both of the attachment optics can be constructed in the same way. Now, let the power of the first lens group be positive, the power of the attachment negative and the magnification ratio n. It is recommendable that the magnification ratio when the attachment optic is mounted in front of the first lens group is low, or about $(1/\sqrt{n})$, while that when the attachment optic is mounted at the back of the first lens group is high, or about $(\sqrt{n})$.

BRIEF DESCRIPTION OF THE DRAWINGS

FIG. 2A shows a section of the lens of the example 1 at the time of $\times 1$.

FIG. 2B shows a section of the lens of the example 1 at the time of $\times 2$.

FIGS. 4A–4C show the diagram of aberrations of the example 1 at the time of $\times 1$.

FIGS. 6A–6C show the diagram of aberrations of the example 2 at the time of $\times 1$.

FIGS. 7A–7C show the diagram of aberrations of the example 2 at the time of $\times 2$.

FIG. 8A shows a section of the lens of the example 3 at the time of $\times 1$.

FIG. 8B shows a section of the lens of the example 3 at the time of $\times 2$.

FIGS. 9A–9C show the diagram of aberrations of the example 3 at the time of $\times 1$.

FIGS. 10A–10C show the diagram of aberrations of the example 3 at the time of $\times 2$.

FIG. 11A shows a section of the lens of the example 4 at the time of $\times 1$.

FIG. 11B shows a section of the lens of the example 4 at the time of $\times 2$.

FIGS. 12A–12C show the diagram of aberrations of the example 4 at the time of $\times 1$.

FIGS. 13A–13C show the diagram of aberrations of the example 4 at the time of $\times 2$.

DESCRIPTION OF THE PREFERRED EMBODIMENTS

Figure 1A:
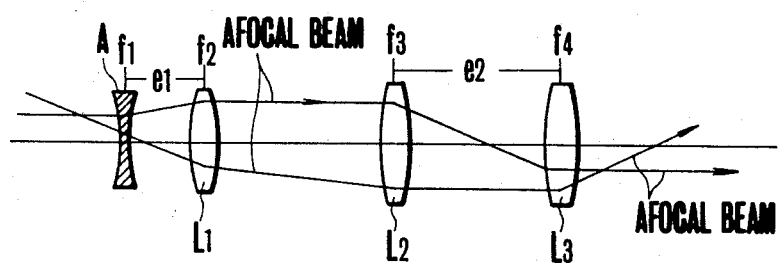
FIG. 1A shows the arrangement of the embodiment of the present invention at the time of the low magnification ratio.
Figure 1B:
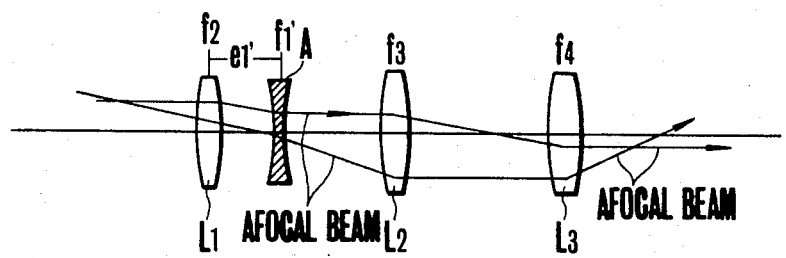
FIG. 1B shows the arrangement of the embodiment of the present invention at the time of the high magnification ratio.

In FIGS. 1A and 1B, A is a similar or an equal attachment negative optic, L1 is a first positive lens group, L2 is a third positive lens group and L3 is a fourth positive lens group, which is the eye piece lens.

When the attachment negative optic A is arranged in front of the first lens group L1 in such a manner that their optical axes are in alignment, they form an afocal inverted telescopic system. Further, when the attachment negative optics A is arranged at the back of the first lens group L2 in such a manner that their optical axes are in alignment, they form an afocal Galilean telescopic system.

Now, for the sake of simplicity, let us suppose that the ratio of magnification ranges from $\times 1$ to $\times n$ and the afocal ratio of magnification of the lens system consisting of the first positive lens group and the attachment negative optic is $1/\sqrt{n}$ for $\times 1$ and $\sqrt{n}$ for $\times n$.

Now, let the focal length of the first positive lens group L1, the second lens group L2 and the third lens group L3 be f2, f3 and f4, the distance between the principal point of the second lens group L2 and that of the third positive lens group L3 be e2, the focal lengths of the attachment negative optic for $\times 1$ and $\times n$ be f1 and f1' and the distances between the principal point of the first positive lens group L1 and that of the attachment negative optic A be e1 and e1'. Hereby, the light beam going out of the first positive lens group L1 for ×1 is parallel, while the light beam going out of the attachment negative optic A for ×2 is parallel and the light beam going out of the third positive lens group L3 is parallel regardless of the ratio of magnification.

| | ×1 | ×n |
|---|---|---|
| The afocal ratio of magnification of the first and the second lens group | $\beta_1 = \frac{1}{\sqrt{n}}$ | $\beta'_1 = \sqrt{n}$ |
| The afocal ratio of magnification of the third and the fourth lens group | $\beta_2 = -\sqrt{n}$ | $\beta'_2 = -\sqrt{n}$ |

Consequently, $$\beta_1 = \frac{f_1}{f_2} = \frac{1}{\sqrt{n}}, \beta_2 = -\frac{f_2}{f_3} = -\sqrt{n}$$

$$\beta'_1 = -\frac{f_2}{f_1} = \sqrt{n}$$

Further, $e_1 = f_1 + f_2$, $e_2 = f_3 + f_4$ and $e_1' = f_2 + f_1'$. Hereby, in case $f_1 = f_1'$, $e_1 = e_1'$. Consequently, it is sufficient to choose f1, f1', f2, f3, f4, e1, e1' and e2 so as to fulfill the above relations.

When now n=2, f1=f1', the afocal ratio of magnification of the lens system consisting of the first positive lens group and the attachment negative optic is 0.7071 for ×1 and 1.4142 for ×2 and the ratio of magnification is divided in ×1 and ×2.

So far there is a known method to insert the afocal lens system with the afocal ratio of magnification of n (=2) at the time of xn (=2), whereby, however, even if the image quality for ×1 is good, it is necessary to eliminate the aberration of the single afocal lens system with the afocal ratio of magnification of n(=2) at the time of ×n (=2) in such a manner that too much effort has to be made for the construction of this afocal lens system. Accordingly, it is remarkably difficult to keep the image quality at the time of ×n (=2) all over the view field by means of a single lens construction.

In accordance with the present invention, the ratio of the afocal lens system is divided into ×1 and ×n, much effort has not to be made for the afocal lens system for ×n. Further, the afocal lens system exists not only in the lens system for ×1 but also in that for ×n, so that it is possible to correct well the aberrations for the whole lens system including this afocal lens system, namely to correct well the image quality all over the whole view field for both ×1 and ×n.

Further, it is possible to alter the ratio of magnification only by inserting or removing the lens group for varying the ratio of magnification, so that the construction of the lens barrel can be simplified to some extent and furthermore the operation can also be simplified.

Further, in the case explained above, the afocal ratio of amplification is chosen $1/\sqrt{n}$ for ×1 and $\sqrt{n}$ for ×n, so that it is possible to correct well the image quality of the afocal lens system all over the whole view field not only for ×1 but also for ×n in a remarkably simple way by means of a simple lens construction.

Further, in this case it is possible to use a common attachment negative object not only for ×1 but also ×n. Further, in the case of the above example, the refractive index of the first lens group is chosen positive, while that of the attachment negative optic is chosen negative so that it is also possible to invert the sign of the refractive index.

As in the case of the example of the lens to be discussed below, in order to maintain the efficiency remarkably high not only for ×1 but also for ×n, at least the following are important. It is recommended that the first positive lens group be constituted with at least two positive lenses in order to well correct the spherical aberration, the distortion and the astigmatism, and the second and the third lens group with at least two positive lenses in order to well correct the distortion and the astigmatism, whereby one of them is recommended to be a combined lens in order to well correct the chromatic aberration. Hereby, it is possible to use a common attachment negative optic not only for ×1 but also for ×n by means of the above-mentiioned lens composition, whereby it is possible to obtain a remarkably good efficiency by means of only one negative lens.

In order to improve the image quality, the following are important.

$1.2 < n < 2.5$ (1)

$f_4 < f_3 < 2f_4$ (2)

$0.42r_2 < r_1 < 0.52r_2$ (3)

$0.85f_{22} < f_{21} < 1.1f_{22}$ (4)

Hereby, r1 and r2 are the radii of curvatures of the attachment negative optic in sequence of the object, while f21 and f22 are the focal lengths of the two positive lenses in the first positive lens group in sequence from the object.

For the relation (1), beyond the upper limit value, it is difficult to correct well the spherical aberration and the astigmatism for ×1 and ×n, while beyond the lower limit value there is slight magnification effect.

The relation (2) is for keeping the necessary amount of the eye point position, whereby, beyond the lower limit value, the eye point position is too short, while beyond the upper limit value, the external diameter of the fourth positive lens group (eye piece lens) is too large, deteriorating the efficiency.

Beyond the upper limit value of the relation (3), the spherical aberration is under corrected and the astigmatism is over-corrected for ×1 and the spherical aberration is over-corrected and the astigmatism is under-corrected for ×n, while beyond the lower limit value the inversed phenomena take place.

Beyond the upper and the lower limit value of the relation (4), the balance between the spherical aberration for ×1 and that for ×n cannot be maintained. Thus, it can be said that the relations (3) and (4) are important to keep the efficiency for ×1 and ×n in remarkably, superior balance.

Below, the numerical examples are given. The radius of curvatures R1–R14, the surface distances D1–D13, the refractive index for d-line N1–N8, relate to the first lens group, the second positive lens group and the third positive lens group, while r1–r4, d1–d5, n1 and n2, v1' and v2' relate to the attachment negative optic. Hereby the arrangement shown with r1 and r2 is for ×1, while that shown with r3 and r4 are for ×n.

Figures 5A, 5B, 5C:
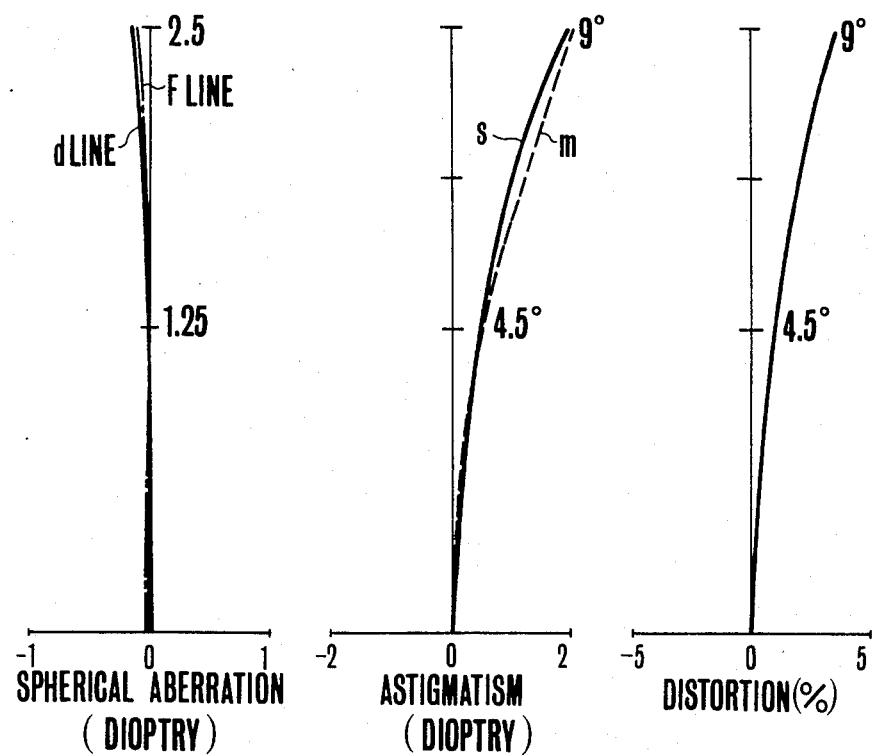
FIGS. 5A–5C show the diagram of aberrations of the example 1 at the time of $\times 2$.

The example (1) corresponds to the lens whose section is shown in FIGS. 2A and 2B. FIG. 4 shows the spherical aberration, the astigmatism and distortion for ×1, while FIG. 5 shows those for ×2.

Figure 3A:
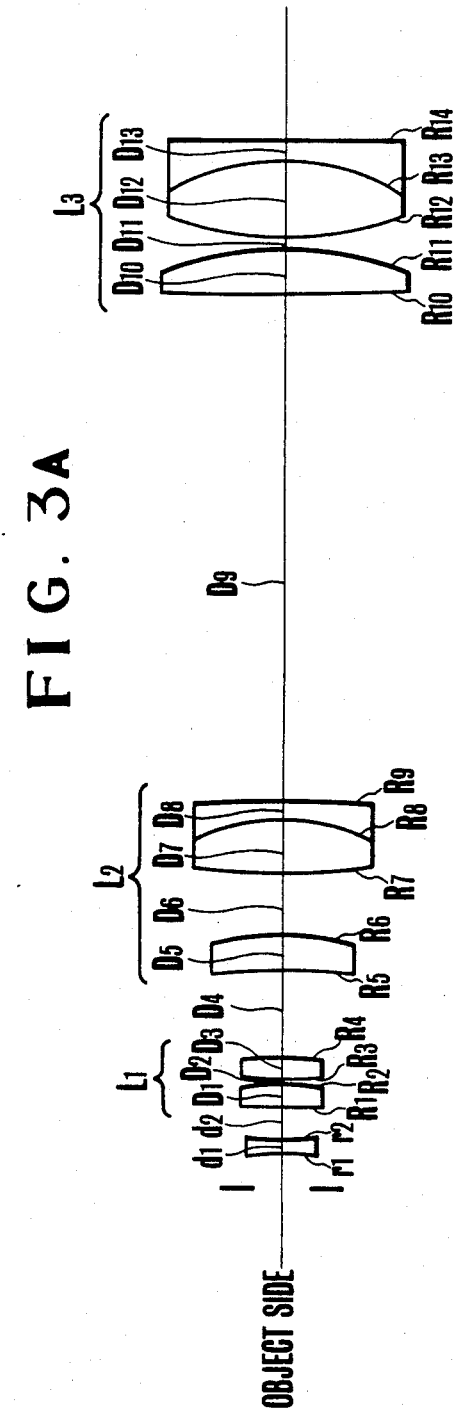
FIG. 3A shows a section of the lens of the example 2 at the time of $\times 1$.
Figure 3B:
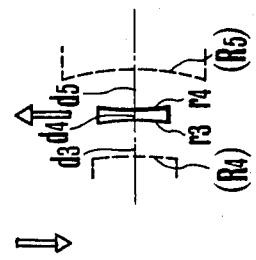
FIG. 3B shows a section of the lens of the example 2 at the time of $\times 2$.

The example (2) corresponds to the lens whose section is shown in FIGS. 3A and 3B. FIG. 6 shows the aberrations for 33 1. FIG. 7 shows those for ×2.

The example (3) corresponds to the lens whose section is shown in FIGS. 8A and 8B. FIG. 9 shows the aberrations for ×1. FIG. 10 shows those for ×2.

The example (4) corresponds to the lens whose section is shown in FIGS. 11A and 11B. FIG. 12 shows the aberrations for 33 1. FIG. 13 shows those for ×2.

Example 1:

|  |  |  |  | ×1 |  | ×2 |  |
|---|---|---|---|---|---|---|---|
| Incident height of on-axial ray |  |  |  | 2.5 mm |  | 2.5 mm |  |
| Picture angle |  |  |  | 36° |  | 18° |  |
| Radius of Curvature |  | Lens Thickness or Distance |  | Refractive Index (Nd) |  | Abbe's Number |  |
| r1 | −13.181 | d1 | 1 |  | n1 1.72 | v1' | 50.2 |
| r2 | 27.69 | d2 | 2.68 |  |  |  |  |
| R1 | ∞ | D1 | 1.8 |  | N1 1.60311 | v1 | 60.7 |
| R2 | −19.894 | D2 | 0.4 |  |  |  |  |
| R3 | 40.435 | D3 | 1.8 |  | N2 1.60311 | v2 | 60.7 |
| R4 | −40.435 | d3 | 3.43 |  |  |  |  |
| r3 | −13.181 | d4 | 1. | } 7 (D4) | n2 1.72 | v2' | 50.2 |
| r4 | 27.69 | d5 | 2.57 |  |  |  |  |
| R5 | −67.479 | D5 | 1 |  | N3 1.69895 | v3 | 30.1 |
| R6 | 24.095 | D6 | 3 |  | N4 1.6968 | v4 | 55.5 |
| R7 | −24.095 | D7 | 20.47 |  |  |  |  |
| R8 | 34.702 | D8 | 3 |  | N5 1.6968 | v5 | 55.5 |
| R9 | 649.17 | D9 | 40.29 |  |  |  |  |
| R10 | 275.635 | D10 | 4 |  | N6 1.6968 | v6 | 55.5 |
| R11 | −31.194 | D11 | 0.2 |  |  |  |  |
| R12 | 22.996 | D12 | 7 |  | N7 1.6968 | v7 | 55.5 |
| R13 | −22.996 | D13 | 1.5 |  | N8 1.7552 | v8 | 27.5 |
| R14 | 63.585 |  |  |  |  |  |  |

Example 2:

|  |  |  |  | ×1 |  | ×2 |  |
|---|---|---|---|---|---|---|---|
| Incident height of on-axial ray |  |  |  | 2.5 mm |  | 2.5 mm |  |
| Picture angle |  |  |  | 36° |  | 18° |  |
| Radius of Curvature |  | Lens Thickness or Distance |  | Refractive Index (Nd) |  | Abbe's Number |  |
| r1 | −13.181 | d1 | 1 |  | n1 1.72 | v1' | 50.2 |
| r2 | 27.69 | d2 | 2.68 |  |  |  |  |
| R1 | ∞ | D1 | 1.8 |  | N1 1.60311 | v1 | 60.7 |
| R2 | −19.894 | D2 | 0.4 |  |  |  |  |
| R3 | 40.435 | D3 | 1.8 |  | N2 1.60311 | v2 | 60.7 |
| R4 | −40.435 | d3 | 3.43 |  |  |  |  |
| r3 | −13.181 | d4 | 1 | } 7 (D4) | n2 1.72 | v2' | 50.2 |
| r4 | 27.69 | d5 | 2.57 |  |  |  |  |
| R5 | −67.479 | D5 | 3 |  | N3 1.6968 | v3 | 55.5 |
| R6 | −24.095 | D6 | 5 |  |  |  |  |
| R7 | 50 | D7 | 4.5 |  | N4 1.6968 | v4 | 55.5 |
| R8 | −16 | D8 | 1.5 |  | N5 1.7552 | v5 | 27.5 |
| R9 | −105.846 | D9 | 41.83 |  |  |  |  |
| R10 | 260 | D10 | 4 |  | N6 1.6968 | v6 | 55.5 |
| R11 | −31.194 | D11 | 0.2 |  |  |  |  |
| R12 | 25 | D12 | 7 |  | N7 1.6968 | v7 | 55.5 |
| R13 | −18 | D13 | 1.5 |  | N8 1.7552 | v8 | 27.5 |
| R14 | 669.288 |  |  |  |  |  |  |

Example 3:

|  |  |  |  | ×1 |  | ×2 |  |
|---|---|---|---|---|---|---|---|
| Incident height of on-axial ray |  |  |  | 2.5 mm |  | 2.5 mm |  |
| Picture angle |  |  |  | 36° |  | 17.6° |  |
| Radius of Curvature |  | Lens Thickness or Distance |  | Refractive Index (Nd) |  | Abbe's Number (vd) |  |
| r1 | −15.023 | d1 | 1. |  | n1 1.6968 | v1' | 55.5 |
| r2 | 22.534 | d2 | 3.406 |  |  |  |  |
| R1 | −149.934 | D1 | 1.6 |  | N1 1.6968 | v1 | 55.5 |
| R2 | −22.05 | D2 | 0.5 |  |  |  |  |
| R3 | 48.0 | D3 | 1.6 |  | N2 1.6968 | v2 | 55.5 |
| R4 | −48.0 | d3 | 4.91 |  |  |  |  |

-continued

Example 3:

|  |  |  |  | ×1 |  | ×2 |  |
|---|---|---|---|---|---|---|---|
| Incident height of on-axial ray |  |  |  | 2.5 mm |  | 2.5 mm |  |
| Picture angle |  |  |  | 36° |  | 17.6° |  |
| Radius of Curvature |  | Lens Thickness or Distance |  | Refractive Index (Nd) |  | Abbe's Number (vd) |  |
| r3 | −12.358 | d4 | 1. | } 8.25 (D4) | n2 1.7859 | v2' | 44.2 |
| r4 | 43.987 | d5 | 2.34 |  |  |  |  |
| R5 | −67.479 | D5 | 1. |  | N3 1.69895 | v3 | 30.1 |
| R6 | 18.0 | D6 | 3. |  | N4 1.6968 | v4 | 55.5 |
| R7 | −24.083 | D7 | 20.47 |  |  |  |  |
| R8 | 34.702 | D8 | 3. |  | N5 1.6968 | v5 | 55.5 |
| R9 | 649.169 | D9 | 38.336 |  |  |  |  |
| R10 | ∞ | D10 | 4. |  | N6 1.6968 | v6 | 55.5 |
| R11 | −28.314 | D11 | 0.2 |  |  |  |  |
| R12 | 37.567 | D12 | 7. |  | N7 1.6968 | v7 | 55.5 |
| R13 | −17.535 | D13 | 1.5 |  | N8 1.7552 | v8 | 27.5 |
| R14 | −151.679 |  |  |  |  |  |  | f1 = −12.796   f1' = −12.181   f2 = 18.086
f3 = 32.005    f4 = 22.603

Example 4:

|  |  |  |  | ×1 |  | ×2.1 |  |
|---|---|---|---|---|---|---|---|
| Incident height of on-axial ray |  |  |  | 2.3 mm |  | 2.3 mm |  |
| Picture angle |  |  |  | 36° |  | 17.6° |  |
| Radius of Curvature |  | Lens Thickness or Distance |  | Refractive Index (Nd) |  | Abbe's Number (vd) |  |
| r1 | −15.023 | d1 | 1. |  | n1 1.6968 | v1' | 55.5 |
| r2 | 22.534 | d2 | 3.406 |  |  |  |  |
| R1 | −149.934 | D1 | 1.6 |  | N1 1.6968 | v1 | 55.5 |
| R2 | −22.05 | D2 | 0.5 |  |  |  |  |
| R3 | 48.0 | D3 | 1.6 |  | N2 1.6968 | v2 | 55.5 |
| R4 | −48.0 | d3 | 4.91 |  |  |  |  |
| r3 | −12.358 | d4 | 1. | } 8.25 (D4) | n2 1.7859 | v2' | 44.2 |
| r4 | 43.987 | d5 | 2.34 |  |  |  |  |
| R5 | −67.479 | D5 | 3. |  | N3 1.713 | v3 | 53.8 |
| R6 | −24.083 | D6 | 0.5 |  |  |  |  |
| R7 | 28.0 | D7 | 5. |  | N4 1.6968 | v4 | 55.5 |
| R8 | −16.5 | D8 | 1. |  | N5 1.69895 | v5 | 30.1 |
| R9 | 67.106 | D9 | 39.82 |  |  |  |  |
| R10 | ∞ | D10 | 5. |  | N6 1.7725 | v6 | 49.6 |
| R11 | −25.4 | D11 | 0.2 |  |  |  |  |
| R12 | 40.0 | D12 | 9.2 |  | N7 1.6583 | v7 | 57.3 |
| R13 | −15.78 | D13 | 1.5 |  | N8 1.80518 | v8 | 25.4 |
| R14 | −53.417 |  |  |  |  |  |  | f1 = −12.796   f1' = −12.181   f2 = 18.086
f3 = 28.0      f4 = 19.8

What is claimed is:

1. A variable magnification ratio lens system comprising:
   a fixed first lens group;
   a second positive lens group arranged at the back of the first lens group so that the optical axis of the second positive lens group is aligned with that of the first lens group;
   an eyepiece arranged at the back of the second lens group so that the optical axis of the eyepiece is aligned with that of the second lens group;
   first attachment optical means arranged to be in front of the first lens group and having a power with a sign different from that of the power of the first lens group; and
   second attachment optical means arranged to be at the back of the first lens group alternatively to the first attachment optical means and having a power with a sign different from that of the power of the first lens group;
   wherein the first attachment optical means and the first lens group form a substantial afocal optical system, and wherein the first lens group and the second attachment optical means form a substantial afocal optical system, and the distance between the first lens group and the second lens group is maintained constant and wherein the first lens group has a positive power, and wherein the first and the second attachment optical means have a negative power, whereby when the magnification factor is n, the afocal magnification ratio with the first attachment optical means and the first lens group is substantially $1/\sqrt{n}$, and that with the first group and the second attachment optical means is substantially $\sqrt{n}$.

2. A variable magnification ratio lens system in accordance with claim 1, wherein the first and the second attachment optical means are negative lenses, whereby the radius of curvature of a front surface of the first attachment optical means is the same as that of the second attachment optical means and the radius of curvature of a rear surface of the first attachment optical means is the same as that of the second attachment optical means.

3. A variable magnification ratio lens system in accordance with claim 1, wherein the first attachment optical means is constructed in the same way as the second attachment optical means.

4. A variable magnification ratio lens system in accordance with claim 1, wherein the first lens group consists of two positive lenses, the second and the third lens group respectively consist of a positive lens and a combined lens and the first and the second attachment optical means respectively consist of a negative lens.

5. A variable magnification ratio lens system comprising:
a fixed and positive first lens group;
a positive second lens group arranged co-axially behind the first lens group;
an eyepiece arranged co-axially behind the second lens group;
negative first attachment lens means arranged to be removably mounted in front of the first lens group;
negative second attachment lens means arranged to be removably mounted behind the second lens group alternatively with respect to the first attachment lens means;
the length of optical path from the first lens group to the second lens group being constant,
said first attachment lens means and said first lens group constituting substantially in afocal optical system,
said first lens group and said second attachment lens means constituting substantially an afocal optical system,
wherein the lens system satisfies the following conditions $1.2 < n < 2.5$ $f4 < f3 < 2f4$ wherein n is the magnification variation ratio when a selected one of the first attachment lens means and the second attachment lens means is mounted, f3 is the focal length of the second lens group, and f4 is the focal length of the third lens group.

6. A variable magnification ratio lens system comprising:
a first lens group consisting of two positive lenses;
a second positive lens group arranged at the back of the first lens group so that the optical axis of the second positive lens group is aligned with that of the first lens group;
a third positive lens group arranged at the back of the second lens group so that the optical axis of the third lens group is aligned with that of the second lens group;
negative first attachment lens means arranged to be in front of the first lens group and having a power with a sign different from that of the power of the first lens group; and
negative second attachment lens means arranged to be at the back of the first lens group alternatively to the first attachment optical means and having a power with a sign different from that of the power of the first lens group;
wherein the first attachment lens means and the first lens group form a substantial afocal optical system, and wherein the first lens group and the second attachment lens means form a substantial afocal optical system, the lens system satisfying the following relations:

$1.2 < n < 2.5$ $f4 < f3 < 2f4$ $0.85f22 < f21 < 1.1f22$ wherein
n = magnification factor,
f3 = focal length of the second lens group,
f4 = focal length of the third lens group,
f21 = focal length of the positive lens at the front side, and
f22 = focal length of the positive lens at the back side.

* * * * *